United States Patent
Gallimore et al.

(10) Patent No.: US 9,664,593 B2
(45) Date of Patent: May 30, 2017

(54) BEARING APPARATUS

(71) Applicant: ROLLS-ROYCE PLC, London (GB)

(72) Inventors: Stephen Gallimore, Derby (GB); Paul Fletcher, Derby (GB); Francis Bridge, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/876,086

(22) Filed: Oct. 6, 2015

(65) Prior Publication Data
US 2016/0123839 A1    May 5, 2016

(30) Foreign Application Priority Data
Oct. 29, 2014   (GB) .................................. 1419214.0

(51) Int. Cl.
*F16C 19/52*   (2006.01)
*F16C 19/16*   (2006.01)
(Continued)

(52) U.S. Cl.
CPC ........... *G01M 13/04* (2013.01); *F01D 21/003* (2013.01); *F01D 25/16* (2013.01); *F01D 25/285* (2013.01); *F02C 7/06* (2013.01); *F16C 19/522* (2013.01); *G01L 5/0009* (2013.01); *F05D 2260/80* (2013.01); *F05D 2260/83* (2013.01); *F05D 2270/304* (2013.01); *F05D 2270/331* (2013.01); *F05D 2270/332* (2013.01); *F05D 2270/821* (2013.01); *F16C 19/163* (2013.01); *F16C 33/58* (2013.01); *F16C 2360/23* (2013.01); *Y02T 50/671* (2013.01)

(58) Field of Classification Search
CPC ...... F16C 19/163; F16C 19/26; F16C 19/522; F16C 33/583; F16C 35/067; F16C 41/007; F16C 2233/00; F16C 2270/304; F16C 2270/332; F16C 2270/821; F16C 2260/80; F16C 19/52; F16C 19/16; F01D 21/003; F01D 25/16; F01D 25/285; F02C 7/06; F05D 2260/83; G01L 5/009; G01M 13/04
USPC .......... 384/448, 490, 507, 516, 513; 73/788; 702/41, 113; 340/540, 635
See application file for complete search history.

(56) References Cited

U.S. PATENT DOCUMENTS

| | | |
|---|---|---|
| 4,578,018 A | 3/1986 | Pope |
| 4,907,943 A | 3/1990 | Kelch |

(Continued)

FOREIGN PATENT DOCUMENTS

| | | | |
|---|---|---|---|
| DE | 102004013669 A1 * | 10/2005 | ............ F16C 19/522 |
| EP | 1873508 A2 | 1/2008 | |

(Continued)

OTHER PUBLICATIONS

Mar. 21, 2016 Search Report issued in European Patent Application No. 15188513.

(Continued)

*Primary Examiner* — Marcus Charles
(74) *Attorney, Agent, or Firm* — Oliff PLC

(57) ABSTRACT

Bearing apparatus comprising: an inner race; an outer race; a roller element positioned between the inner race and the outer race; a first sensor to sense displacement of one of: the inner race, the outer race, and the roller element, and to provide a first signal for the sensed displacement to enable a load on the bearing apparatus to be determined.

15 Claims, 6 Drawing Sheets

(51) Int. Cl.
*G01M 13/04* (2006.01)
*F01D 21/00* (2006.01)
*F01D 25/16* (2006.01)
*F01D 25/28* (2006.01)
*F02C 7/06* (2006.01)
*G01L 5/00* (2006.01)
*F16C 33/58* (2006.01)

(56) References Cited

U.S. PATENT DOCUMENTS

| | | | | |
|---|---|---|---|---|
| 5,677,488 | A | * | 10/1997 | Monahan ............... F16C 19/30 340/682 |
| 6,571,632 | B1 | * | 6/2003 | Browner ............... G01L 5/0009 73/593 |
| 7,688,081 | B2 | | 3/2010 | Webster |
| 2004/0244496 | A1 | * | 12/2004 | Bernhard ............... G01L 5/0009 73/779 |
| 2005/0286823 | A1 | * | 12/2005 | Singh ..................... F01D 17/02 384/448 |
| 2006/0045406 | A1 | | 3/2006 | Iwamoto et al. |
| 2007/0018837 | A1 | * | 1/2007 | Mizutani ............... F16C 41/008 340/635 |
| 2007/0143039 | A1 | * | 6/2007 | Mol ........................ F16C 19/52 702/41 |
| 2008/0234964 | A1 | * | 9/2008 | Miyasaka ............... G01H 1/003 702/113 |
| 2009/0044542 | A1 | | 2/2009 | Thatcher et al. |
| 2009/0128166 | A1 | | 5/2009 | Webster |
| 2009/0266169 | A1 | * | 10/2009 | Marconnet .......... G01M 13/045 73/660 |
| 2011/0125421 | A1 | * | 5/2011 | Takahashi ........... B60B 27/0005 702/42 |
| 2012/0079830 | A1 | | 4/2012 | Rodriguez et al. |
| 2012/0126648 | A1 | * | 5/2012 | Georgi ................... F16C 19/18 310/90.5 |
| 2013/0177269 | A1 | * | 7/2013 | Akiyama ............... F16C 19/186 384/448 |

FOREIGN PATENT DOCUMENTS

| | | | | |
|---|---|---|---|---|
| EP | 2354578 | A2 | | 8/2011 |
| EP | 2446998 | A1 | | 5/2012 |
| EP | 2746610 | A1 | | 6/2014 |
| JP | 59188535 | A | * | 10/1984 |
| JP | 2004-270898 | A | | 9/2004 |
| JP | 2004270898 | A | * | 9/2004 |
| JP | 2005283247 | A | * | 10/2005 |
| JP | 2008-275510 | A | | 11/2008 |
| JP | 4811778 | B2 | * | 11/2011 ............ F16C 19/522 |
| JP | 2012130927 | A | * | 7/2012 |
| JP | 5355058 | B2 | * | 11/2013 |
| WO | WO 0123862 | A1 | * | 4/2001 ............ G01L 3/1464 |
| WO | WO 03071284 | A2 | * | 8/2003 ............ G01P 3/443 |
| WO | 2012/123010 | A1 | | 9/2012 |

OTHER PUBLICATIONS

Apr. 7, 2015 Search Report issued in British Patent Application No. 1419214.0.

* cited by examiner

BEARING APPARATUS

The present disclosure concerns bearing apparatus, methods for determining load on bearing apparatus, and apparatus to determine load on bearing apparatus.

Mechanical systems, such as gas turbine engines, usually comprise a plurality of bearings that provide an interface between a rotatable part and a stationary part. The operating load on such bearings may be difficult to determine during design. To compensate for the uncertainty, the bearing may be designed to be able to operate under relatively high loads. This may result in the bearing being larger than needed and being more susceptible to 'skidding' (i.e. erratic movement of the roller element between the races) at low loads.

For example, the axial thrust on the shaft of a gas turbine engine is generated by the pressure difference across a compressor and a turbine. The pressures at the compressor and the turbine have relatively large uncertainties and are affected by engine operating conditions and by variations in internal air flows. The consequence of these uncertainties is that the actual rotor thrust may vary from the design intent. The bearings of the gas turbine engine may be designed to be larger than needed to compensate for the uncertainty in the rotor thrust.

According to various, but not necessarily all, embodiments of the invention there is provided bearing apparatus comprising: an inner race; an outer race; a roller element positioned between the inner race and the outer race; a first sensor to sense displacement of one of: the inner race, the outer race, and the roller element, and to provide a first signal for the sensed displacement to enable a load on the bearing apparatus to be determined.

The outer race or the inner race may define an aperture. The first sensor may be positioned at least partially within the aperture to sense displacement of the roller element.

The first sensor may comprise a microwave probe or an eddy current probe.

The bearing apparatus may further comprise a second sensor to sense displacement of the inner race and to provide a second signal for the sensed displacement of the inner race to enable the load on the bearing apparatus to be determined.

The bearing apparatus may further comprise a third sensor to sense displacement of the outer race and to provide a third signal for the sensed displacement of the outer race to enable the load on the bearing apparatus to be determined.

The bearing apparatus may further comprise a controller to receive the first signal and to determine the load on the bearing apparatus.

The controller may be to receive a signal for rotational speed of a shaft, and to determine the load on the bearing apparatus using the rotational speed and the sensed displacement of the inner race or the roller element.

The controller may be to provide the determined load to an output device to inform a user of the determined load to enable the user to modify the design of the bearing apparatus.

The controller may be to determine abnormal operation of the bearing apparatus by analysing the sensed displacement of the roller element and/or a rotational speed of the roller element sensed by the first sensor.

The controller may determine abnormal operation of the bearing apparatus, the controller may be to provide a control signal to at least one component to reduce or prevent abnormal operation of the bearing apparatus.

According to various, but not necessarily all, embodiments of the invention there is provided a gas turbine engine comprising bearing apparatus as described in any of the preceding paragraphs.

According to various, but not necessarily all, embodiments of the invention there is provided a method for determining load on bearing apparatus, the method comprising: receiving a first signal for sensed displacement of at least one of: an inner race; an outer race; and a roller element; and determining a load on the bearing apparatus using at least the received first signal for sensed displacement.

The method may further comprise receiving a signal for sensed rotational speed of a shaft and determining the load on the bearing apparatus using the sensed rotational speed and the sensed displacement of the roller element or the inner race.

The method may further comprise receiving a second signal for the sensed displacement of the inner race; and determining the load on the bearing apparatus using the second signal.

The method may further comprise receiving a third signal for the sensed displacement of the outer race; and determining the load on the bearing apparatus using the third signal.

The method may further comprise providing the determined load to an output device to inform a user of the determined load to enable the user to modify the design of the bearing apparatus.

The method may further comprise determining abnormal operation of the bearing apparatus by analysing the sensed displacement of the roller element and/or a sensed rotational speed of the roller element.

The method may further comprise providing a control signal to at least one component to reduce or prevent abnormal operation of the bearing apparatus when abnormal operation of the bearing apparatus is determined.

According to various, but not necessary all, embodiments of the invention there is provided apparatus to determine load on bearing apparatus, the apparatus comprising: a controller to perform the method as described in any of the preceding paragraphs.

According to various, but not necessarily all, embodiments of the invention there is provided a computer program that, when performed by a computer, causes performance of the method as described in any of the preceding paragraphs.

According to various, but not necessarily all, embodiments of the invention there is provided a non-transitory computer readable storage medium comprising computer readable instructions that, when read by a computer, causes performance of the method as described in any of the preceding paragraphs.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

In the following description, the terms 'connect' and 'couple' mean operationally connected and coupled. It should be appreciated that there may be any number of intervening components between the mentioned features, including no intervening components.

Figure 1:
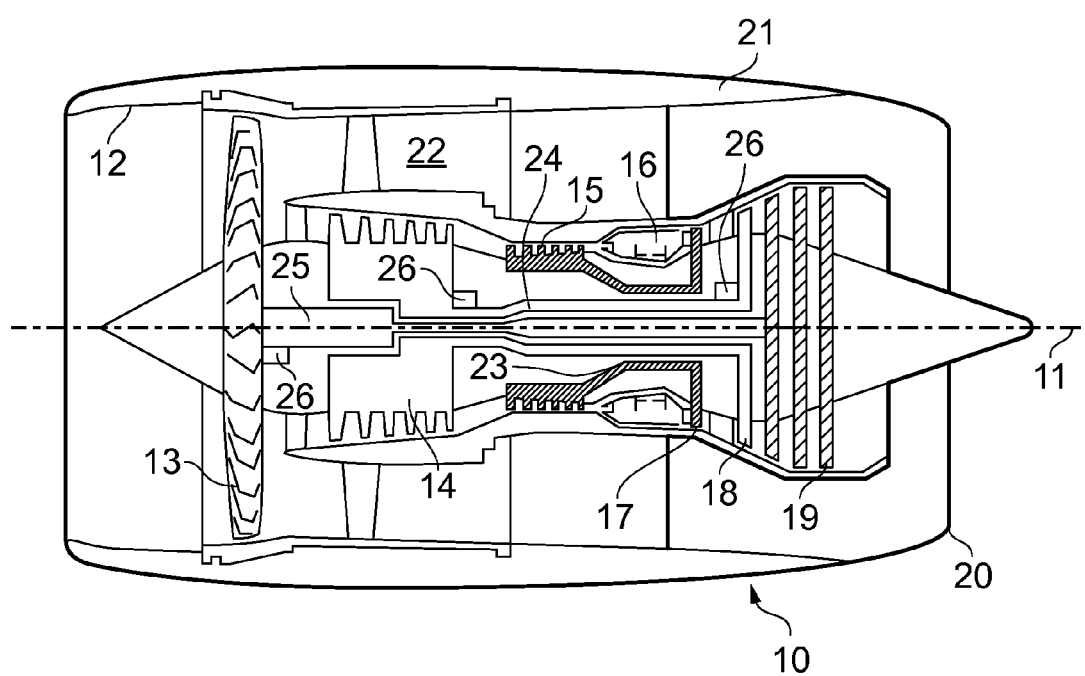
FIG. 1 illustrates a schematic cross sectional side view of a gas turbine engine according to an example.

FIG. 1 illustrates a schematic cross sectional side view of a gas turbine engine 10 according to an example. The gas turbine engine 10 has a principal and rotational axis 11, and comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19, and an exhaust nozzle 20. A nacelle 21 generally surrounds the engine 10 and defines both the intake 12 and the outlet nozzle 20.

Air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust.

The gas turbine engine 10 further comprises a high pressure shaft 23 coupling the high pressure compressor 15 and the high pressure turbine 17, an intermediate pressure shaft 24 coupling the intermediate pressure compressor 14 and the intermediate pressure turbine 18, and a fan shaft 25 coupling the fan 13 and the low pressure turbine 19. Each shaft 23, 24, 25 is mounted by one or more respective bearing apparatus 26, either to another shaft, or to a static structure of the gas turbine engine 10. The bearing apparatus 26 may constrain radial (i.e. vibration) and axial (i.e. thrust) loads.

Figure 2:
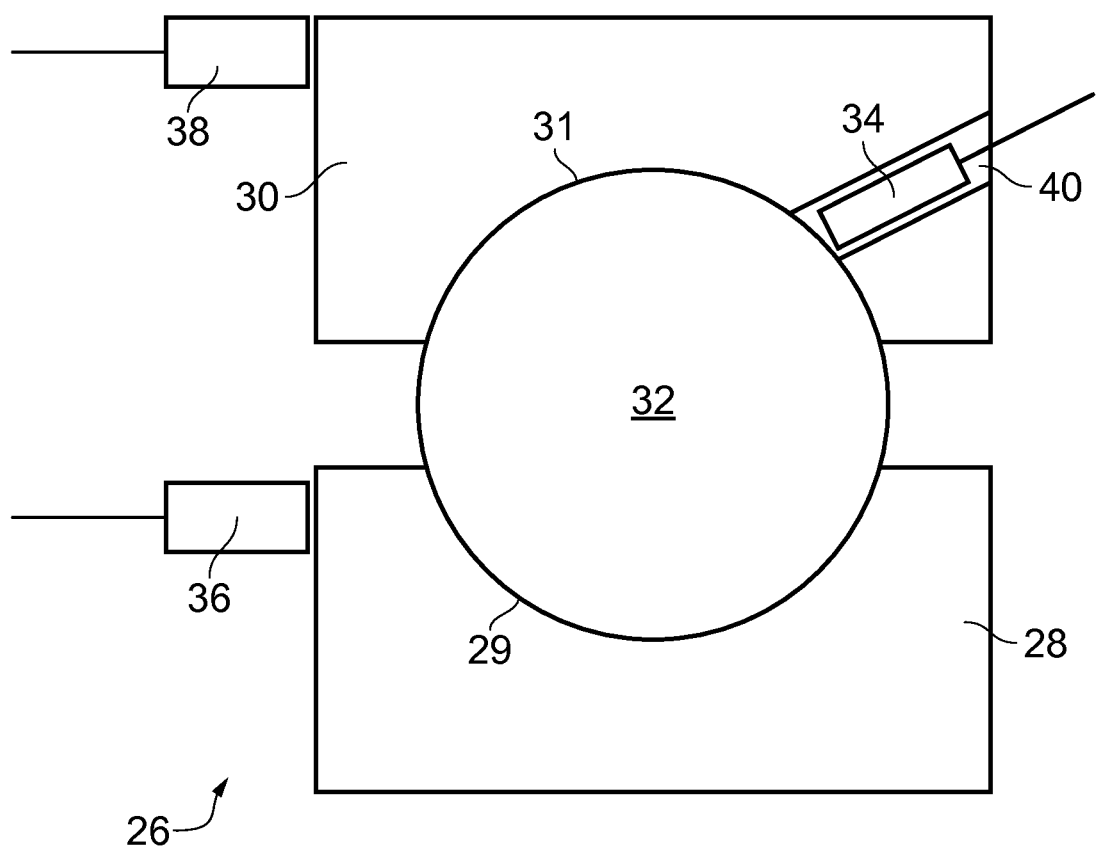
FIG. 2 illustrates a schematic cross sectional side view of bearing apparatus according to various examples.

FIG. 2 illustrates a schematic cross sectional side view of bearing apparatus 26 according to various examples. The bearing apparatus 26 includes an inner race 28, an outer race 30, a roller element 32 (which may also be referred to as a rolling element), a first sensor 34, a second sensor 36, and a third sensor 38. The bearing apparatus 26 may be mounted to any of the high pressure shaft 23, the intermediate pressure shaft 24, and the fan shaft 25, and another shaft, or to a static structure of the gas turbine engine 10. In other examples, the bearing apparatus 26 may be mounted in another mechanical system (different to a gas turbine engine) between a rotatable member and a static (or rotatable) member.

The inner race 28 (which may also be referred to as a 'first bearing support member') may be coupled to one of the high pressure shaft 23, the intermediate pressure shaft 24, and the fan shaft 25. The inner race 28 defines an annular shape which may be centred on the axis 11 of the gas turbine engine 10. The inner race 28 also defines a groove 29 for receiving a part of the roller element 32 therein. The inner race 28 may comprise any suitable material and may comprise, for example, a metal such as steel.

The outer race 30 (which may also be referred to as a 'second bearing support member') may be coupled to a static member or to one of the intermediate pressure shaft 24 and the high pressure shaft 23. The outer race 30 defines an annular shape which is concentric with the inner race 28 and may be centred on the axis 11 of the gas turbine engine 10. The outer race 30 defines a groove 31 for receiving a part of the roller element 32 therein. The outer race 30 may comprise any suitable material and may comprise, for example, a metal such as steel.

The roller element 32 is positioned within the grooves 29, 31 defined by the inner and outer races 28, 30 respectively and is arranged to move in a circle between the inner and outer races 28, 30 (for example, in a circle around the principle axis 11 of the gas turbine engine 10). The cavity defined between the grooves 29, 31 has a larger cross sectional area than the roller element 32 and consequently, the roller element 32 is able to move within the cavity (that is, the roller element 32 has a limited amount of 'play' between the inner and outer races 28, 30).

The roller element 32 may be a ball bearing or any other suitable type of roller element bearing (for example, the roller element 32 may be a bearing element that carries axial loads and may be, for example, a taper roller). The roller element 32 may comprise any suitable material and may comprise a metal (such as steel), or may comprise a ceramic material.

It should be appreciated that the bearing apparatus 26 may comprise a plurality of roller elements 32 positioned between the inner and outer races 28, 30. For example, the bearing apparatus 26 may comprise a plurality of roller elements 32 that are positioned equidistantly from one another within the grooves 29, 31 of the inner and outer races 28, 30.

In some examples, the outer race 30 defines an aperture 40 that extends from the exterior surface of the outer race 30 to the groove 31. The first sensor 34 is positioned at least partially within the aperture 40 to sense displacement of the roller element 32 between the inner and outer races 28, 30. As described in detail in the following paragraphs, the first sensor 34 is arranged to provide a first signal for the sensed displacement to enable a load on the bearing apparatus 26 to be determined. The first sensor 34 may be any suitable sensor for measuring the displacement of the roller element 32 and may be a microwave probe or an eddy current probe for example. Additionally or alternatively, the inner race 28 may define an aperture for receiving a sensor to sense displacement of the roller element 32 between the inner and outer races 28, 30.

The second sensor 36 is arranged to sense displacement of the inner race 28 relative to another component of the gas turbine engine 10, and to provide a second signal for the sensed displacement of the inner race 28 to enable the load on the bearing apparatus 26 to be determined. In some examples, the second sensor 36 is positioned adjacent the inner race 28 to sense the displacement of the inner race 28 relative to the outer race 30. The second sensor 36 may be any suitable sensor for measuring the displacement of the inner race 28 and may be microwave probe or an eddy current probe for example.

The third sensor 38 is arranged to sense displacement of the outer race 30 relative to another component of the gas turbine engine 10, and to provide a third signal for the sensed displacement of the outer race 30 to enable the load on the bearing apparatus 26 to be determined. In some examples, the third sensor 38 is positioned adjacent the outer race 30 to sense the displacement of the outer race 30 relative to a component of the gas turbine engine (a shaft for example). The third sensor 38 may be any suitable sensor for measuring the displacement of the outer race 30 and may be microwave probe or an eddy current probe for example.

In some examples, the bearing apparatus 26 may include only one or two of the first sensor 34, the second sensor 36 and the third sensor 38. For example, a bearing apparatus 26 may only include the first sensor 34, or the second sensor 36, or the third sensor 38. By way of another example, the bearing apparatus 26 may only include the first sensor 34 and the second sensor 36, or the second sensor 36 and the third sensor 38, or the first sensor 34 and the third sensor 38.

Figure 3:
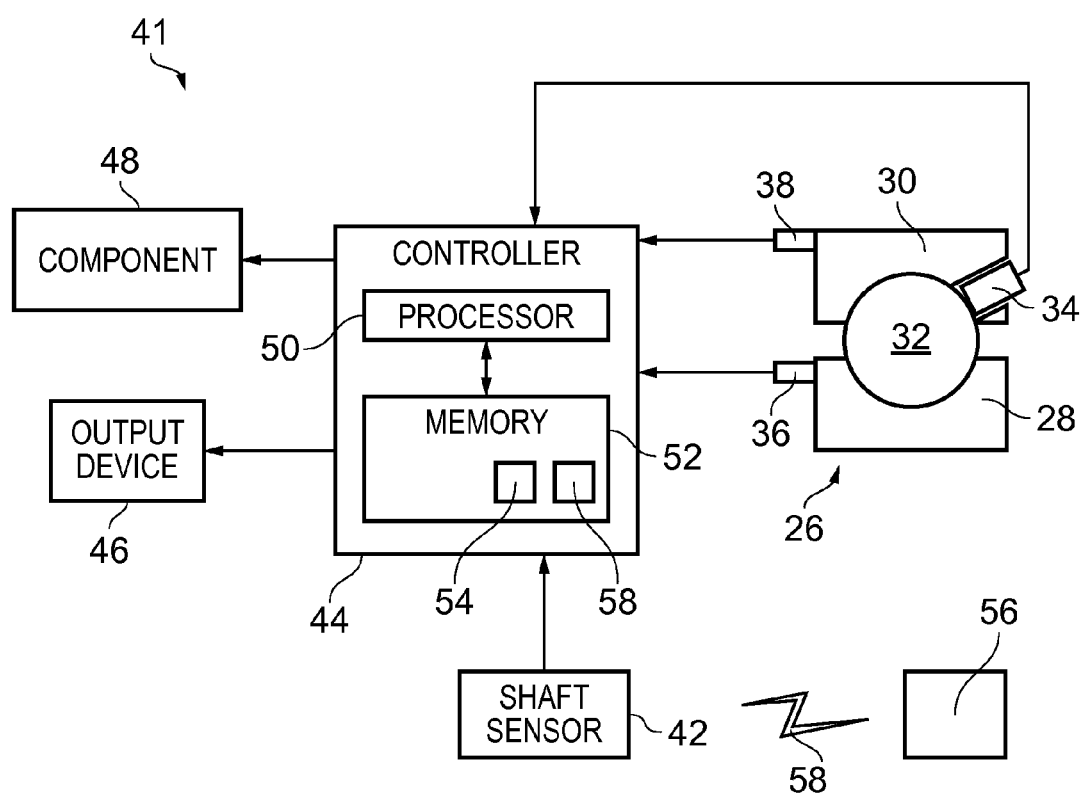
FIG. 3 illustrates a schematic diagram of apparatus according to various examples.

FIG. 3 illustrates a schematic diagram of apparatus 41 including the bearing apparatus 26 illustrated in FIG. 2, and apparatus for determining load on the bearing apparatus 26. Consequently, the apparatus 41 includes the inner race 28, the outer race 30, the roller element 32, and at least one of: the first sensor 34; the second sensor 36; and the third sensor 38. Additionally, the apparatus 41 includes a shaft sensor 42, a controller 44, an output device 46, and a component 48.

The shaft sensor 42 is arranged to sense the rotational speed of at least one of the high pressure shaft 23, the intermediate pressure shaft 24 and the fan shaft 25 and to provide a fourth signal for sensed rotational speed. The shaft sensor 42 may comprise any suitable sensor for sensing the rotational speed of a shaft and may comprise, for example, a variable reluctance sensor, a microwave sensor, an eddy current sensor, a capacitance sensor, an inductance sensor. In other examples, the sensor 42 may be arranged to sense the rotational speed of another rotatable component (different to a shaft) on which the bearing apparatus 26 is mounted.

The controller 44 is arranged to receive the first signal from the first sensor 34, the second signal from the second sensor 36, the third signal from the third sensor 38, and the fourth signal from the shaft sensor 42, and to determine the load on the bearing apparatus 26.

Figure 7:
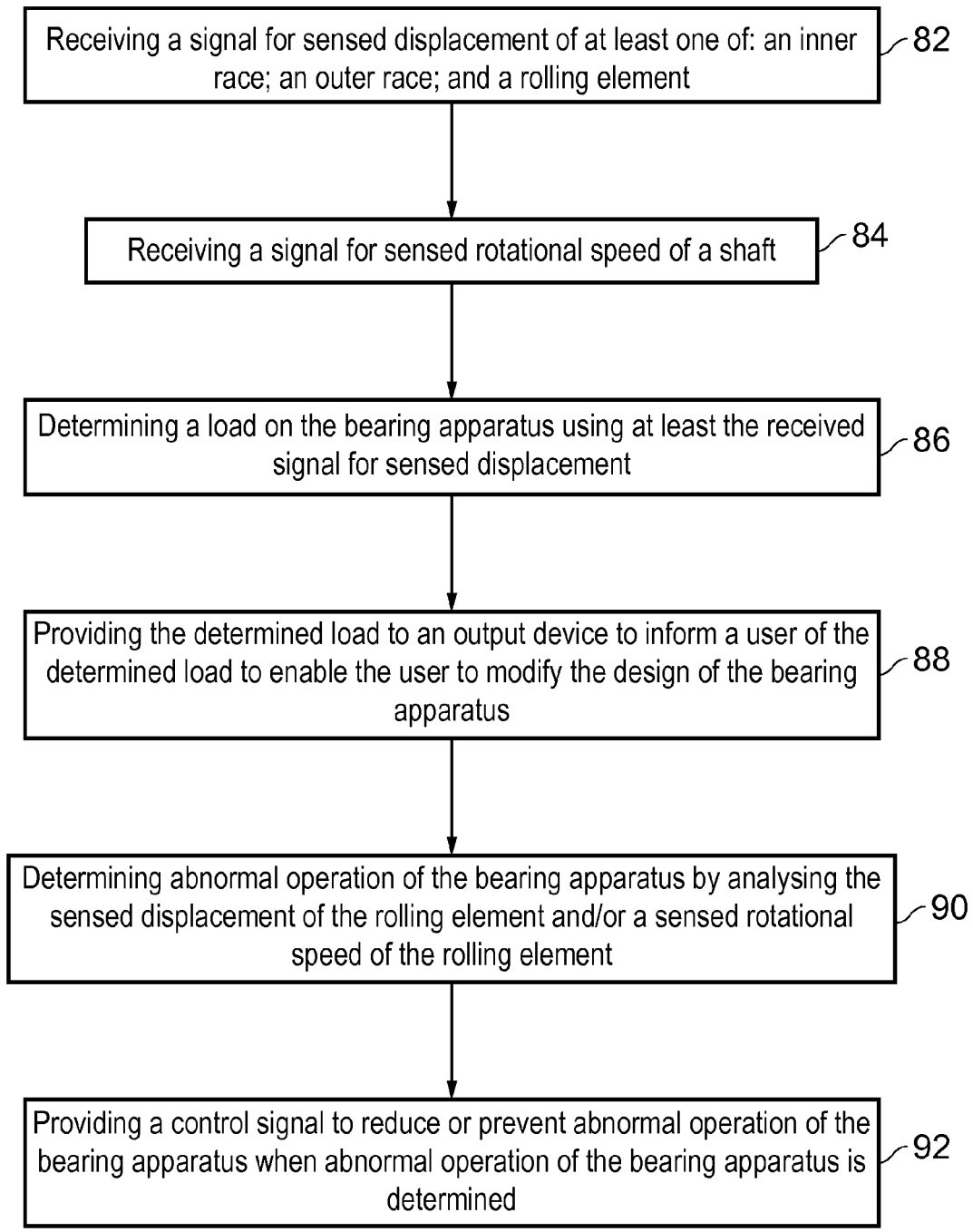
FIG. 7 illustrates a flow chart of a method for determining load on bearing apparatus according to various examples.

The controller 44 may comprise any suitable circuitry to cause performance of the methods described herein and as illustrated in FIG. 7. For example, the controller 44 may comprise at least one application specific integrated circuit (ASIC) and/or at least one field programmable gate array (FPGA) to perform the methods. By way of another example, the controller 44 may comprise at least one processor 50 and at least one memory 52. The memory 52 stores a computer program 54 comprising computer readable instructions that, when read by the processor 50, causes performance of the methods described herein, and as illustrated in FIG. 7. The computer program 54 may be software or firmware, or may be a combination of software and firmware.

As will be described in more detail with reference to FIG. 6, the memory 52 also stores data 58 that enables the processor 50 to determine the load on the bearing apparatus 26 from sensed displacements and shaft rotational speeds. The data 58 may comprise, for example, a look up table, and/or a graph, and/or an algorithm.

The processor 50 may be located on the gas turbine engine 10, or may be located remote from the gas turbine engine 10, or may be distributed between the gas turbine engine 10 and a location remote from the gas turbine engine 10. The processor 50 may include at least one microprocessor and may comprise a single core processor, or may comprise multiple processor cores (such as a dual core processor or a quad core processor).

The memory 52 may be located on the gas turbine engine 10, or may be located remote from the gas turbine engine 10, or may be distributed between the gas turbine engine 10 and a location remote from the gas turbine engine 10. The memory 52 may be any suitable non-transitory computer readable storage medium, data storage device or devices, and may comprise a hard disk and/or solid state memory (such as flash memory). The memory 52 may be permanent non-removable memory, or may be removable memory (such as a universal serial bus (USB) flash drive).

The computer program 54 may be stored on a non-transitory computer readable storage medium 56. The computer program 54 may be transferred from the non-transitory computer readable storage medium 56 to the memory 52. The non-transitory computer readable storage medium 56 may be, for example, a USB flash drive, a compact disc (CD), a digital versatile disc (DVD) or a Blu-ray disc. In some examples, the computer program 54 may be transferred to the memory 52 via a wireless signal 58 or via a wired signal 58.

The output device 46 may be any suitable device for conveying information to a user. For example, the output device 46 may be a display (such as a liquid crystal display, or a light emitting diode display, or an active matrix organic light emitting diode display, or a thin film transistor display, or a cathode ray tube display) and/or a loudspeaker. The controller 44 is arranged to provide a signal to the output device 46 to cause the output device 46 to convey information to the user.

The component 48 may be any component or components of the gas turbine engine 10 that cause a load to be placed on the bearing apparatus 26. The controller 44 is arranged to provide a control signal to cause a change in the component 48 and thereby change the load on the bearing apparatus 26. For example, bearing loads may be controlled by changing the force applied to a shaft. A pneumatic or hydraulic piston may be controlled by the controller 44 to change the force applied to a shaft. Additionally or alternatively, the controller 44 may control the opening and closing of handling bleeds.

The following paragraphs explain how displacement of the inner race 28, the outer race 30, and the roller element 32 occurs in operation, and how the sensed displacement may be used to determine the load on the bearing apparatus 26.

Figure 4:
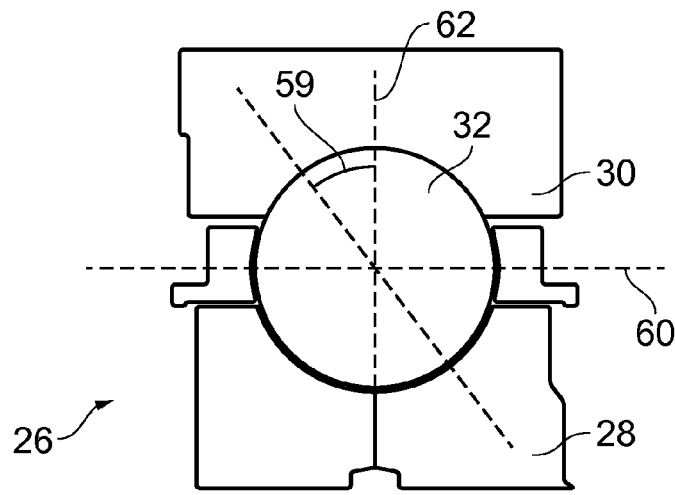
FIG. 4 illustrates a schematic cross sectional side view of the bearing apparatus illustrated in FIG. 2 and a contact angle between a roller element and the inner and outer races.

FIG. 4 illustrates a schematic cross sectional side view of the bearing apparatus 26 illustrated in FIG. 2 and a contact angle 59 between a roller element 32 and the inner and outer races 28, 30. FIG. 4 also illustrates a first axis 60 that is oriented parallel to the principal axis 11 of the gas turbine engine 10, and a second axis 62 that is oriented perpendicular to the principal axis 11 of the gas turbine engine 10.

The contact angle 59 between the roller element 32 and the inner and outer races 28, 30 may be defined as the angle formed between the first axis 60, and a line through the centre of the roller element 32 and a point at which the roller element 32 contacts the inner race 28 or the outer race 30. The contact angle 59 is measured from the second axis 62 in an anti-clockwise direction, such that the angle illustrated in FIG. 4 is positive.

In operation of the gas turbine engine 10, the contact angle 59 of the roller element 32 may change depending on the operational conditions of the gas turbine engine 10. For example, the contact 59 of the roller element 32 varies with axial thrust and with shaft rotational speed. As axial thrust increases (where the axial thrust vector is oriented to the left, parallel to the first axis 60), the contact angle 59 increases as the roller element 32 moves towards the left (as illustrated in FIG. 4). As the rotational speed of the shaft increases, centrifugal force on the roller element 32 increases and the roller element 32 moves upwards (as illustrated in FIG. 4). Consequently, at low thrust load and high shaft rotational speed, the contact angle 59 tends towards a minimum of zero, whilst at high thrust load and low shaft rotational speed, the contact angle 59 tends towards a maximum of approximately forty five degrees.

Figure 5:
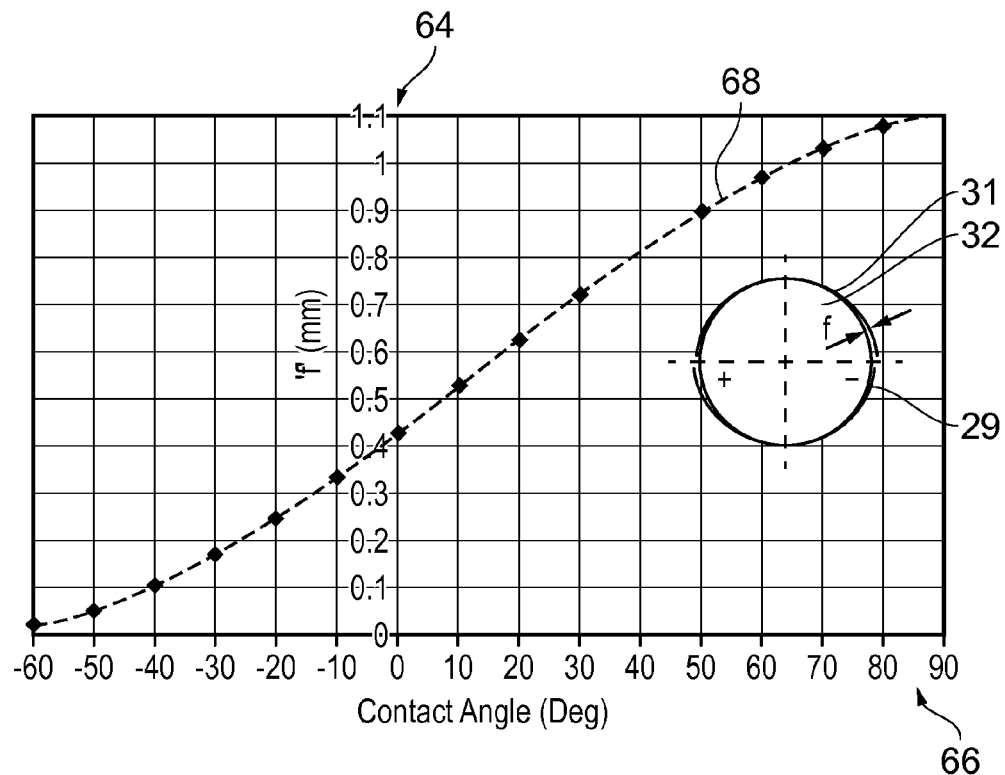
FIG. 5 illustrates a graph of roller element displacement versus contact angle of the roller element according to various examples.

FIG. 5 illustrates a graph of roller element 32 displacement 'f' versus contact angle 59 of the roller element 32 according to various examples. The graph includes a vertical axis 64 for displacement of the roller element 32, a horizontal axis 66 for the contact angle 59, and a line 68 that illustrates how the roller element 32 displacement varies with the contact angle 59. FIG. 5 also illustrates the surfaces of the grooves 29, 31 of the inner and outer races 28, 30, the roller element 32, and the displacement 'f' of the roller element 32.

The line 68 has an increasing gradient between the contact angles of minus sixty degrees and minus ten degrees, a substantially constant positive gradient between the contact angles of minus ten degrees and plus fifty degrees, and a decreasing gradient between the contact angles of fifty degrees and ninety degrees.

By way of an example (and as illustrated in FIG. 5), the displacement of the roller element 32 at a contact angle of zero degrees is approximately 0.45 millimeters. By way of another example, the displacement of the roller element 32 at a contact angle of plus forty five degrees is approximately 0.85 millimeters.

Figure 6:
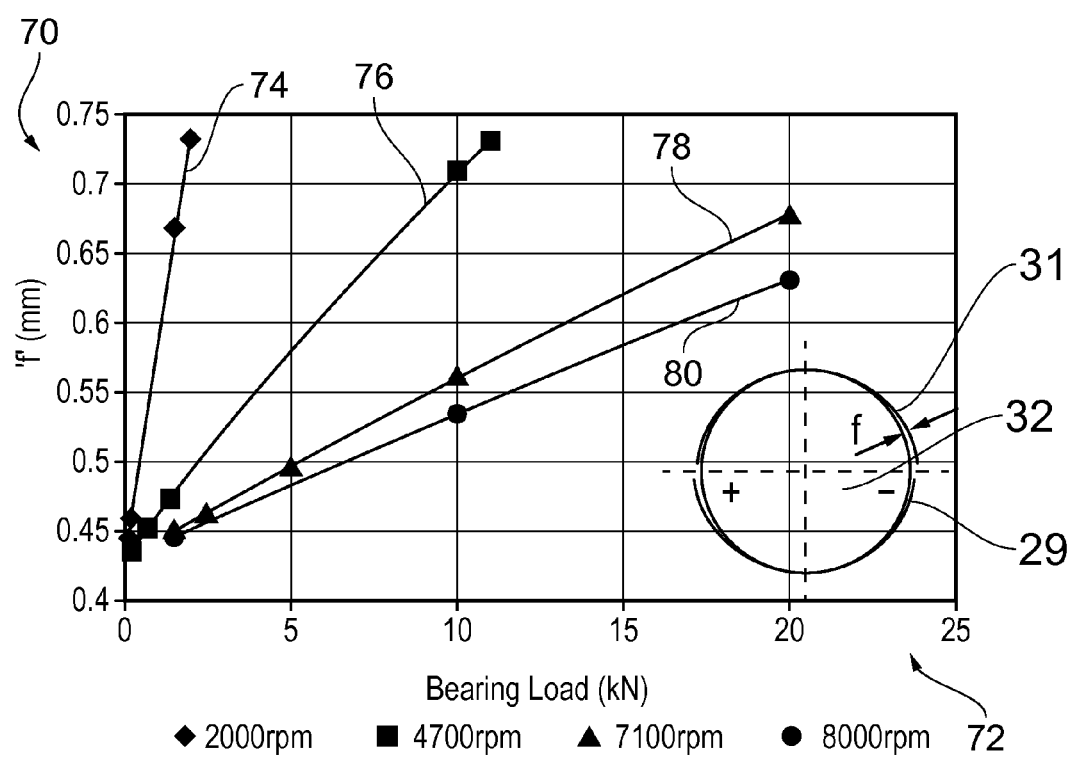
FIG. 6 illustrates a graph of roller element displacement versus load on the bearing apparatus for various shaft rotational speeds according to various examples.

FIG. 6 illustrates a graph of roller element 32 displacement 'f' versus load on the bearing apparatus 26 for various shaft rotational speeds according to various examples. The graph includes a vertical axis 70 for displacement of the roller element 32, a horizontal axis 72 for the load on the bearing apparatus 26, a first line 74 that illustrates how the displacement of the roller element 32 varies with bearing load at a shaft rotational speed of two thousand revolutions per minute (rpm), a second line 76 that illustrates how the displacement of the roller element 32 varies with bearing load at a shaft rotational speed of four thousand seven hundred rpm, a third line 78 that illustrates how the displacement of the roller element 32 varies with bearing load at a shaft rotational speed of seven thousand one hundred rpm, and a fourth line 80 that illustrates how the displacement of the roller element 32 varies with bearing load at a shaft rotational speed of eight thousand rpm. FIG. 6 also illustrates the surfaces of the grooves 29, 31 of the inner and outer races 28, 30, the roller element 32, and the displacement 'f' of the roller element 32.

The first line 74, the second line 76, the third line 78 and the fourth line 80 have constant positive gradients. The first line 74 has a greater gradient than the second line 76, the second line 76 has a greater gradient than the third line 78, and the third line 78 has a greater gradient than the fourth line 80. Consequently, it should be appreciated that as the rotational speed of the shaft increases, the displacement of the roller element 32 decreases for a constant thrust load on the bearing apparatus 26.

The memory 52 stores the relationships between load on the bearing apparatus 26, rotational speed of the shaft, and the displacement of the roller element 32 as data 58. The data 58 may be stored as a graph (for example, as illustrated in FIG. 6), as a look-up table, or as one or more algorithms. It should be appreciated that where the controller 44 has received sensed values for displacement of the roller element 32 and shaft rotational speed, the controller 44 may use the data 58 to determine the load on the bearing apparatus 26. The data 58 may additionally, or alternatively, include the relationship between load on the bearing apparatus 26, the rotational speed of the shaft, and the displacement of the inner race 28 (which is similar to the relationship mentioned above for the displacement of the roller element 32). Additionally or alternatively, the data 58 may include the relationship between load on the bearing apparatus 26, and the displacement of the outer race 30 (which is a linear relationship similar to the one illustrated in FIG. 6).

FIG. 7 illustrates a flow chart of a method for determining load on bearing apparatus 26 according to various examples.

At block 82, the method includes receiving a signal for sensed displacement of at least one of: the inner race 28, the outer race 30, and the roller element 32. For example, the controller 44 may receive any one of, or any combination of, the first signal from the first sensor 34, the second signal from the second sensor 36, and the third signal from the third sensor 38. It should be appreciated that the first signal may comprise the sensed displacements of a plurality of roller elements 32 over a period of time as different roller elements 32 move past the first sensor 34.

At block 84, the method may include receiving a signal for sensed rotational speed of a shaft. For example, the controller 44 may receive a signal for the sensed rotational speed of the high pressure shaft 23 illustrated in FIG. 1. Where the bearing apparatus 26 is mounted on another rotatable part, the controller 44 may receive a signal for sensed rotational speed of that rotatable part.

At block 86, the method includes determining a load on the bearing apparatus 26 using at least the signal received in block 82. For example, the controller 44 may determine the load on the bearing apparatus 26 by using the data 58 stored in the memory 52 and a sensed displacement of the outer race 30 received via the third signal. By way of another example, the controller 44 may determine the load on the bearing apparatus 26 by using the data 58, a sensed displacement of the roller element 32 (or sensed displacements of a plurality of roller elements 32) received via the first signal, and a sensed rotational speed of the shaft. By way of a further example, the controller 44 may determine the load on the bearing apparatus 26 by using the data 58, a sensed displacement of the inner race 28, and a sensed rotational speed of the shaft.

At block 88, the method may include providing the determined load to an output device 46 to inform a user of the determined load. For example, the controller 44 may provide the determined load in a signal to a display 46 to enable the display 46 to display the determined load to a user.

Advantageously, the user may modify the design of the bearing apparatus 26 using the determined load. For example, where the user has accurate information of the maximum load on the bearing apparatus 26, the user may reduce the size of the bearing apparatus 26. This may advantageously save cost since the bearing apparatus may comprise less material. Additionally, this may advantageously reduce the weight of the bearing apparatus 26 which may increase the efficiency of the mechanical system in which the bearing apparatus 26 is mounted. Furthermore, the reduced size of the bearing apparatus 26 may reduce or prevent skidding of the roller element when the bearing apparatus 26 is subject to relatively low loads.

Accurately knowing the bearing loads on the bearing apparatus 26 may also help to maximise bearing service life and reduce engine fuel consumption (since compromising the compressor or turbine design, or increasing air system flows, to change the loads reduces engine efficiency).

At block 90, the method may include determining abnormal operation of the bearing apparatus by analysing the sensed displacement of the roller element 32 and/or a sensed rotational speed of the roller element 32. For example, the controller 44 may analyse the first signal received from the first sensor 34 to determine if the sensed displacement is erratic and indicative of the roller element 32 skidding (that is, the value of the sensed displacement varies over a period of time above a threshold level).

By way of another example, the first sensor 34 may additionally be arranged to sense the rotational speed of the roller element 32 and provide a signal to the controller 44 for the sensed rotational speed. The controller 44 may analyse the signal received from the first sensor 34 to determine if the rotational speed is erratic and indicative of the roller element 32 skidding (that is, the controller 44 determines whether the rotational speed varies over a period of time above a threshold level).

At block 92, the method may include providing a control signal to reduce or prevent abnormal operation of the bearing apparatus 26, when abnormal operation of the bearing apparatus 26 is determined in block 90. For example, the controller 44 may control the opening and closing of handling bleeds to change the bearing load to prevent abnormal operation of the bearing apparatus 26. Additionally or alternatively, the controller 44 may control a piston to apply a force to a shaft to change the bearing load.

It should be appreciated that the method illustrated in FIG. 7 may be performed 'offline' on data which has been measured and recorded previously. Alternatively it may be performed in 'real-time', that is at the same time that the data is measured. In this case the controller 44 may be coupled to the bearing apparatus 26. Where the bearing apparatus 26 forms part of a gas turbine engine 10, the controller 44 may be an electronic engine controller or another on-board processor. Where the gas turbine engine 10 powers an aircraft, the computer may be an engine controller, a processor on-board the engine 10, or a processor on-board the aircraft.

It will be understood that the invention is not limited to the embodiments above-described and various modifications and improvements can be made without departing from the various concepts described herein. For example, the bearing apparatus 26 may additionally or alternatively include a sensor positioned between the inner and outer races 28, 30 to sense the displacement of the roller element 32. This may be achieved, for example, by positioning the sensor face up to the races 28, 30 without cutting into them. The sensor may be a microwave sensor. In some examples, the sensor may be able to detect relative movement between the inner/outer races 28, 30 and the roller element 32.

Except where mutually exclusive, any of the features may be employed separately or in combination with any other features and the invention extends to and includes all combinations and sub-combinations of one or more features described herein.

The invention claimed is:
1. Bearing apparatus comprising:
   an inner race;
   an outer race;
   a roller element positioned between the inner race and the outer race;
   a first sensor to sense displacement of one of: the inner race and the roller element, and to provide a first signal for the sensed displacement to enable a load on the bearing apparatus to be determined; and
   a controller to receive the first signal and to determine the load on the bearing apparatus, wherein the controller is to receive a signal for rotational speed of a shaft, and to determine the load on the bearing apparatus using the rotational speed and the sensed displacement of the inner race or the roller element.

2. Bearing apparatus as claimed in claim 1, wherein the outer race or the inner race define an aperture, the first sensor being positioned at least partially within the aperture to sense displacement of the roller element.

3. Bearing apparatus as claimed in claim 1, wherein the first sensor comprises a microwave probe or an eddy current probe.

4. Bearing apparatus as claimed in claim 1, further comprising a second sensor to sense displacement of the inner race and to provide a second signal for the sensed displacement of the inner race to enable the load on the bearing apparatus to be determined.

5. Bearing apparatus as claimed in claim 1, further comprising a third sensor to sense displacement of the outer race and to provide a third signal for the sensed displacement of the outer race to enable the load on the bearing apparatus to be determined.

6. Bearing apparatus as claimed in claim 1, wherein the controller is to provide the determined load to an output device to inform a user of the determined load to enable the user to modify the design of the bearing apparatus.

7. Bearing apparatus as claimed in claim 1, wherein the controller is to determine abnormal operation of the bearing apparatus by analyzing the sensed displacement of the roller element and/or a rotational speed of the roller element sensed by the first sensor.

8. Bearing apparatus as claimed in claim 7, wherein if the controller determines abnormal operation of the bearing apparatus, the controller is to provide a control signal to at least one component to reduce or prevent abnormal operation of the bearing apparatus.

9. A gas turbine engine comprising bearing apparatus as claimed in claim 1.

10. A method for determining load on bearing apparatus, the method comprising:
   receiving a first signal for sensed displacement of at least one of: an inner race and a roller element;
   receiving a signal for sensed rotational speed of a shaft; and
   determining a load on the bearing apparatus using the sensed rotational speed and the sensed displacement of the roller element or the inner race.

11. A method as claimed in claim 10, further comprising receiving a second signal for the sensed displacement of the inner race; and determining the load on the bearing apparatus using the second signal.

12. A method as claimed in claim 10, further comprising receiving a third signal for the sensed displacement of the outer race; and determining the load on the bearing apparatus using the third signal.

13. A method as claimed in claim 10, further comprising providing the determined load to an output device to inform a user of the determined load to enable the user to modify the design of the bearing apparatus.

14. A method as claimed in claim 10, further comprising determining abnormal operation of the bearing apparatus by analyzing the sensed displacement of the roller element and/or a sensed rotational speed of the roller element.

15. A method as claimed in claim 10, further comprising providing a control signal to at least one component to reduce or prevent abnormal operation of the bearing apparatus when abnormal operation of the bearing apparatus is determined.

* * * * *